United States Patent
Matsushita et al.

(10) Patent No.: US 6,925,374 B2
(45) Date of Patent: Aug. 2, 2005

(54) MISFIRE DETECTION APPARATUS OF INTERNAL COMBUSTION ENGINE

(75) Inventors: Kenji Matsushita, Tokyo (JP); Kimihiko Tanaya, Tokyo (JP); Koichi Okamura, Tokyo (JP); Mitsuru Koiwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 73 days.

(21) Appl. No.: 10/273,272

(22) Filed: Oct. 18, 2002

(65) Prior Publication Data

US 2003/0200023 A1 Oct. 23, 2003

(30) Foreign Application Priority Data

Apr. 17, 2002 (JP) ...................................... P.2002-114707

(51) Int. Cl.⁷ .............................. G06G 7/70; F02P 17/00
(52) U.S. Cl. ...................... 701/114; 701/101; 701/111; 73/116; 73/117.3; 123/179.3; 123/406.14; 123/479; 123/484
(58) Field of Search ......................... 123/179.3, 406.27, 123/406.14, 419, 425, 436, 479, 484, 630, 430; 73/116, 117.3; 701/101, 111, 114

(56) References Cited

U.S. PATENT DOCUMENTS

| | | | | |
|---|---|---|---|---|
| 5,189,373 A | * | 2/1993 | Murata et al. ............... | 324/399 |
| 5,337,716 A | * | 8/1994 | Fukui et al. ............ | 123/406.14 |
| 5,775,298 A | * | 7/1998 | Haller .................... | 123/406.27 |
| 6,185,500 B1 | * | 2/2001 | Ketterer et al. ............. | 701/111 |
| 6,246,952 B1 | * | 6/2001 | Honda ........................ | 701/111 |
| 6,371,078 B1 | * | 4/2002 | Kondo et al. ............... | 123/305 |
| 6,550,456 B1 | * | 4/2003 | Uchida et al. .............. | 123/479 |

FOREIGN PATENT DOCUMENTS

| | | |
|---|---|---|
| JP | 04-308360 A | 10/1992 |
| JP | 04-308360 | 10/1992 |
| JP | 05-87036 A | 4/1993 |
| JP | 4-203271 | 6/1999 |

* cited by examiner

Primary Examiner—Willis R. Wolfe
Assistant Examiner—Johnny H. Hoang
(74) Attorney, Agent, or Firm—Sughrue Mion, PLLC

(57) ABSTRACT

A misfire detection apparatus of an internal combustion engine for detecting combustion or a misfire of an air fuel mixture in the internal combustion engine based on an ion current generated at the combustion time of the air fuel mixture. The misfire detection apparatus includes ion current detection means and misfire determination means. The ion current detection means detects the ion current responsive to the amount of ions occurring in a cylinder just after combustion of the air fuel mixture in the cylinder in the internal combustion engine. The misfire determination means calculates a predetermined function based on the ion current detection value and determines that the condition is combustion when the magnitude exceeds a threshold value.

7 Claims, 6 Drawing Sheets

US 6,925,374 B2

MISFIRE DETECTION APPARATUS OF INTERNAL COMBUSTION ENGINE

BACKGROUND OF THE INVENTION

1. Field of the Invention

This invention relates to a misfire detection apparatus of an internal combustion engine for detecting combustion or a misfire of the internal combustion engine based on an ion current.

2. Background Art

It is generally known that if an air fuel mixture is burnt in a cylinder of an internal combustion engine, ions are produced. Then, if a probe with a high voltage applied as a bias voltage is installed in the cylinder, the ions can be observed as an ion current.

This means that the presence or absence of the ion current is detected, whereby it can be determined that combustion or a misfire occurs separately in each of all cylinders.

FIG. 6 is a drawing to show the configuration of a misfire detection apparatus of an internal combustion engine in a related art, and FIG. 7 is a timing chart to show the operation of the misfire detection apparatus. In FIG. 6, numeral 1 denotes an ignition section. The ignition section 1 comprises an ignition coil IG wherein a positive voltage $V_B$ is applied to the high-voltage side of a primary winding 11 and a switching element 13 for shutting off a primary current is connected between the low-voltage side and ground and an ignition plug 14 is connected to the high-voltage side of a secondary winding 12 and an ion current detection section 15 is connected to the low-voltage side via a wiring conductor.

The ion current detection section 15 includes a bias circuit 16 for applying a positive bias voltage to the ignition plug 14.

Next, the operation of the apparatus in the related art is as follows:

To use the secondary voltage of the ignition coil IG to detect an ion current, the bias circuit 16 charges the ignition plug 14 with a positive high voltage (bias voltage) as an ion current detection probe.

When an ignition pulse $I_B$ is given to the switching element 13, the primary current of the primary winding 11 of the ignition coil IG on the falling edge of the ignition pulse $I_B$ is shut off. A negative high voltage is applied to the ignition plug 14 connected to the secondary winding 12 and discharge is started between electrodes of the ignition plug 14, whereby an air fuel mixture is ignited and explosive combustion occurs. As explosive combustion of the air fuel mixture occurs, ions are produced by the ionization action in the explosive cylinder.

At this time, the positive bias voltage is applied to the ignition plug 14 by the bias circuit 16 charged by the secondary voltage and thus the ions cause an electron move to occur by the bias voltage and are detected as an ion current.

However, as shown in FIGS. 7A and 7B, before the ions are detected, a steep pulse occurs when the ignition pulse IB rises, and at the ignition time in the air fuel mixture caused by discharge by the ignition plug 14, a steep pulse also occurs as ignition noise when the ion current occurs.

Generally, the peak value of the ion current changes depending on the operation state of the engine; when the engine speed is low, the peak value tends to become small and when the engine speed is high, the peak value tends to become large. The value becomes several $\mu A$ to several hundred $\mu A$. To detect a misfire based on the presence or absence of the ion current in all areas of the engine operation condition, the threshold value for ion current detection is set to several $\mu A$.

In fact, however, if the threshold value is set to several $\mu A$, when the ignition pulse IB rises, ignition noise occurring at the ignition time of the ignition plug 14 may be erroneously detected as a combustion pulse. Therefore, the pulses each having a narrow pulse width are eliminated by a mask circuit (mask means) 17 and then only the ion current component is pulse-shaped by a waveform shaping circuit 118 and the result is output as a combustion pulse.

Therefore, in the normal combustion, as shown in FIG. 7C, the combustion pulse provided by performing waveform shaping of the ion current by the waveform shaping circuit 118 is output in the mask time after the discharge starting.

FIG. 7D shows the ion current waveform at the misfire time; the pulse at the ignition pulse rising or falling time and the pulse caused by ignition noise are removed by the mask circuit and thus are not output. Therefore, as shown in FIG. 7E, combustion explosion in the cylinder is suppressed because of misfire, of course, and thus a combustion pulse caused by an ion current is not output either.

In the normal combustion state, as described above, the waveform of the ion current is shaped based on a predetermined fixed threshold value and whether or not a combustion pulse exists is determined, whereby whether the condition is combustion or a misfire can be determined. However, soot may be deposited between the electrodes of the ignition plug because of combustion of an air fuel mixture depending on the operation state of the internal combustion engine.

For example, assuming that the bias voltage is 100 V and that the insulating resistance of the ignition plug 14 when soot is deposited is 5 M$\Omega$, a 20 $\mu A$ leak current flows. Consequently, as shown in FIG. 8, as the ignition pulse IB is applied, while the leak current is monotonously attenuated with a predetermined time constant, it flows into the ion current detection section 15. At the discharge starting time of the ignition plug 14, an ion current caused by combustion is superposed on the leak current gradually monotonously decreased with time constant CR of high resistance caused by soot and capacitor component C of the bias circuit and flows.

Therefore, when the leak current flows, if the ion current input through the mask circuit is pulse-shaped by the waveform shaping circuit, the leak current of a predetermined pulse width generated by ignition pulse application, the leak current gradually monotonously decreased with the time constant CR is detected as a combustion pulse regardless of a misfire or combustion; this is a problem.

SUMMARY OF THE INVENTION

It is therefore an object of the invention to provide a misfire detection apparatus of an internal combustion engine, capable of detecting only the ion current component produced by combustion at the combustion time if a leak current occurs.

A misfire detection apparatus of an internal combustion engine according to an aspect of this invention includes ion current detection means and misfire determination means. The ion current detection means detects an ion current generated at the combustion time of the air fuel mixture. The ion current is responsive to the amount of ions occurring in a cylinder just after combustion of the air fuel mixture in the cylinder in the internal combustion engine. The misfire determination means calculates a predetermined function based on the ion current detection value and determines that the condition is combustion when the magnitude exceeds a threshold value.

According to this aspect of the invention, when a leak current and a misfire occur simultaneously, erroneous combustion determination can be avoided.

DETAILED DESCRIPTION OF THE PREFERRED EMBODIMENTS

-First Embodiment-

A first embodiment of the invention will be discussed with reference to the accompanying drawings.

Figure 4:
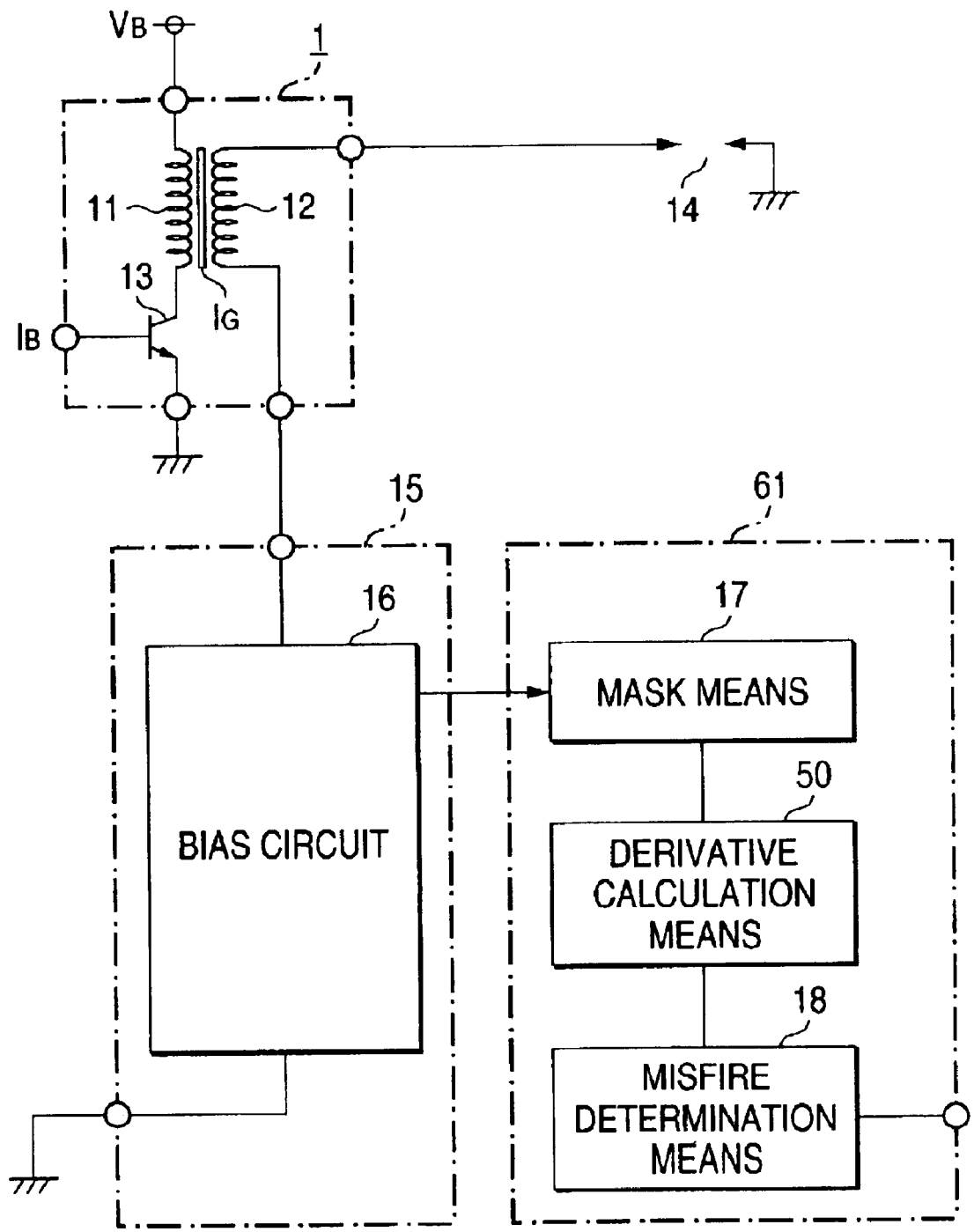
FIG. 4 is a drawing to show the configuration of a misfire detection apparatus of an internal combustion engine in the first embodiment of the invention.

FIG. 4 is a drawing to show the configuration of a misfire detection apparatus of an internal combustion engine of this embodiment. In FIG. 4, numeral 1 denotes an ignition section. The ignition section 1 includes an ignition coil IG wherein a positive voltage $V_B$ is applied to the high-voltage side of a primary winding 11 and a switching element 13 for shutting off a primary current is connected between the low-voltage side and ground and an ignition plug 14 is connected to the high-voltage side of a secondary winding 12 and an ion current detection section 15 is connected to the low-voltage side via a wiring conductor. The ion current detection section 15 is connected to a microprocessor 61.

The ion current detection section 15 includes a bias circuit 16 for applying a positive bias voltage to the ignition plug 14. The microprocessor 61 includes mask means 17, derivative calculation means 50, and misfire determination means 18. A DSP or the like may be used instead of the microprocessor 61.

To use the secondary voltage of the ignition coil IG to detect an ion current, the bias circuit 16 charges the ignition plug 14 with a positive high voltage (bias voltage) as an ion current detection probe.

When an ignition pulse $I_B$ is given to the switching element 13, the primary current of the primary winding 11 of the ignition coil IG on the falling edge of the ignition pulse $I_B$ is shut off. A negative high voltage is applied to the ignition plug 14 connected to the secondary winding 12 and discharge is started between electrodes of the ignition plug 14, whereby an air fuel mixture is ignited and explosive combustion occurs. As explosive combustion of the air fuel mixture occurs, ions are produced by the ionization action in the explosive cylinder.

At this time, the positive bias voltage is applied to the ignition plug 14 by the bias circuit 16 charged by the secondary voltage and thus the ions cause an electron move to occur by the bias voltage. Then, the bias circuit 16 detects an ion current.

Figure 3:
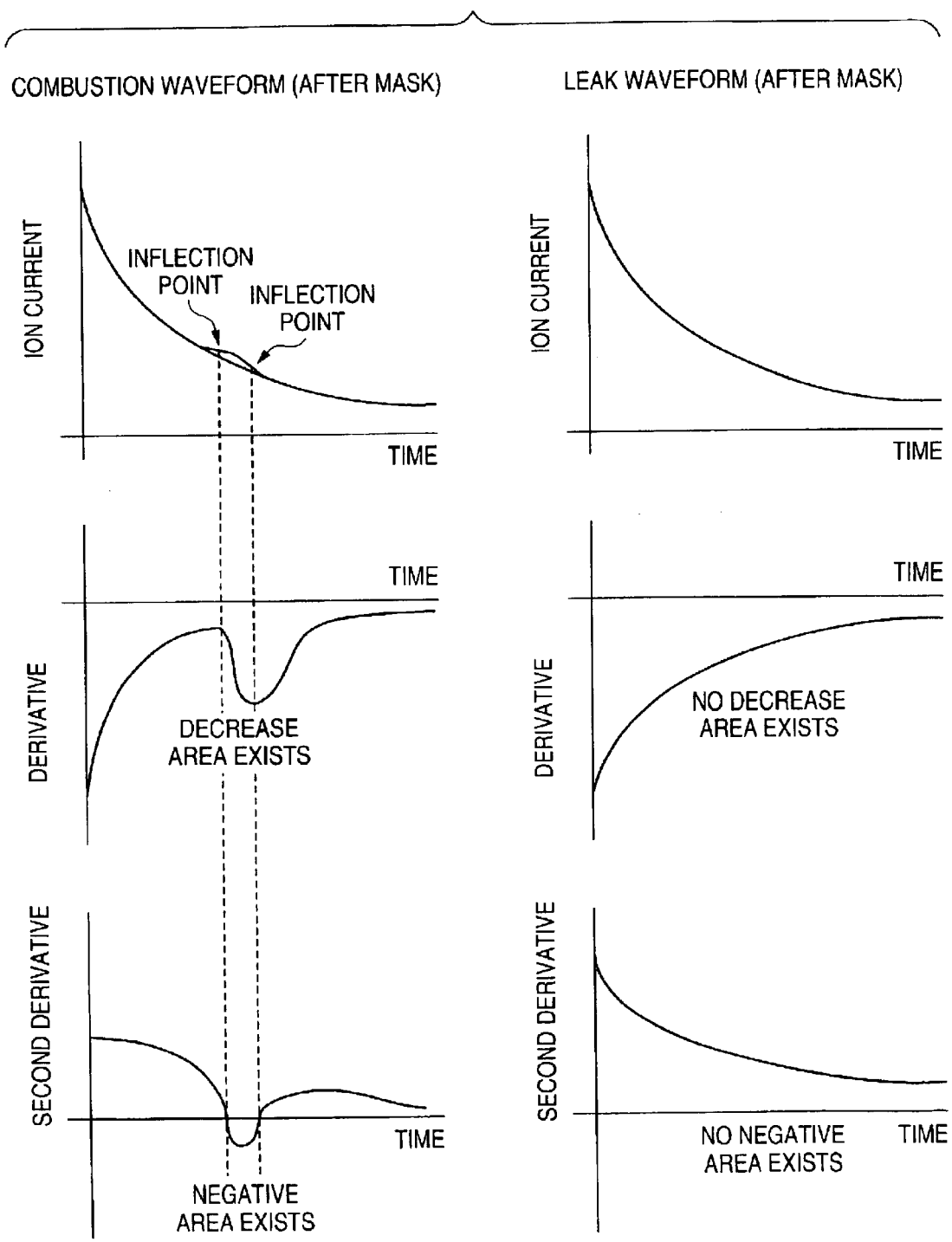
FIG. 3 is timing charts to show the operation of the misfire detection apparatus of the first, second embodiment of the invention.

Next, the operation of the misfire detection apparatus of the first embodiment will be discussed with reference to FIGS. 1 and 3.

Figure 1:
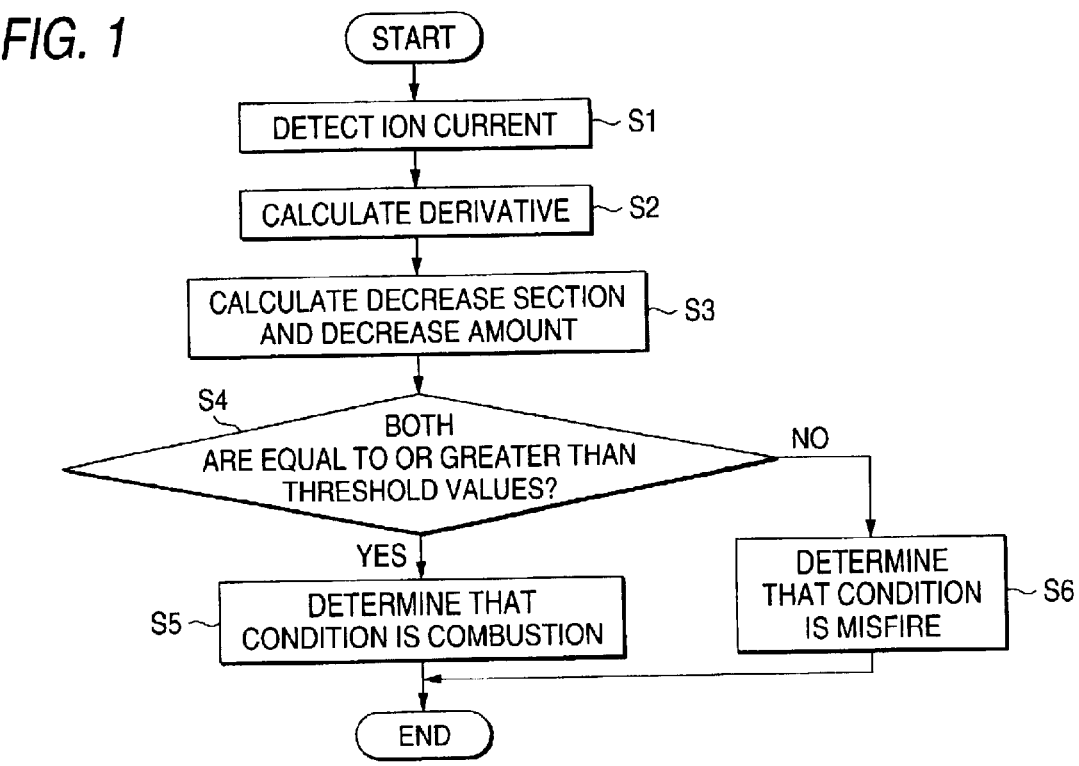
FIG. 1 is a flowchart to show the operation of a misfire detection apparatus of an internal combustion engine according to a first embodiment of the invention.

FIG. 1 is a flowchart to show the operation of a misfire detection apparatus of an internal combustion engine according to the first embodiment of the invention.

The bias circuit 16 detects an ion current (step S1), and the derivative calculation means 50 calculates a derivative of the ion current (step S2).

A peak caused by the initial noise occurs in the ion current waveform. When calculating the derivative, the initial portion of the ion current waveform is masked by the mask means 17 for removing initial noise. The derivative is calculated in the area in which mask is conducted so as to use only the waveform data after the peak.

The misfire detection means 18 calculates the decrease section of the derivative and the decrease amount of the derivative in the section (step S3). The second derivative may be also calculated at the same time as the derivative is calculated. The second derivative is used to find the section in which the derivative decreases, and thus the decrease amount of the derivative in the section can be calculated.

The misfire determination means 18 compares absolute values of the section and the decrease amount with threshold values (Step S4). If both are equal to or greater than the threshold values, the misfire determination means 18 determines that the condition is combustion (step S5); otherwise, it is determined that the condition is a misfire (step S6)

-Second Embodiment-

A second embodiment of the invention will be discussed with reference to the accompanying drawings.

Figure 5:
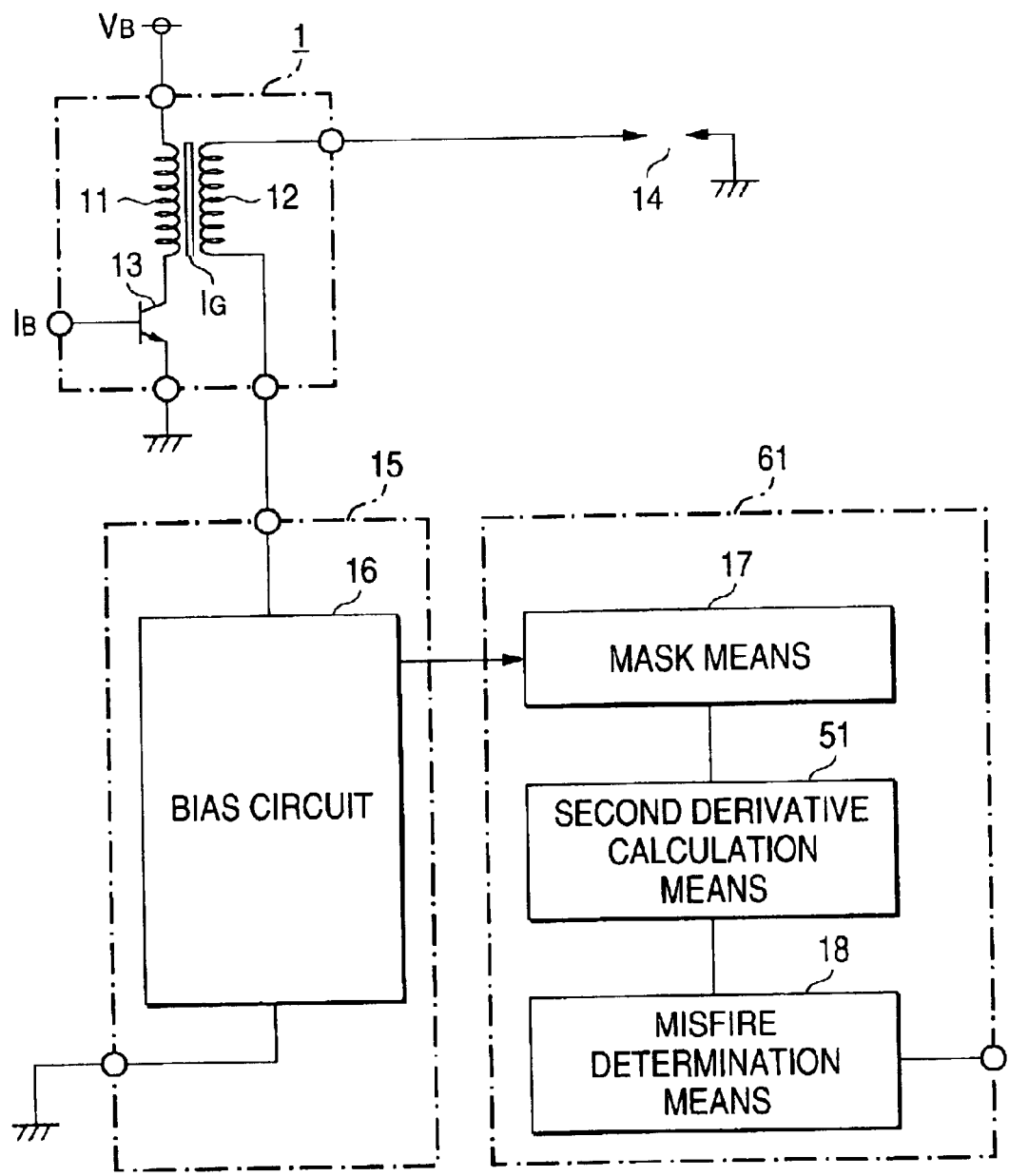
FIG. 5 is a drawing to show the configuration of a misfire detection apparatus of an internal combustion engine in the second embodiment of the invention.
Figure 6:
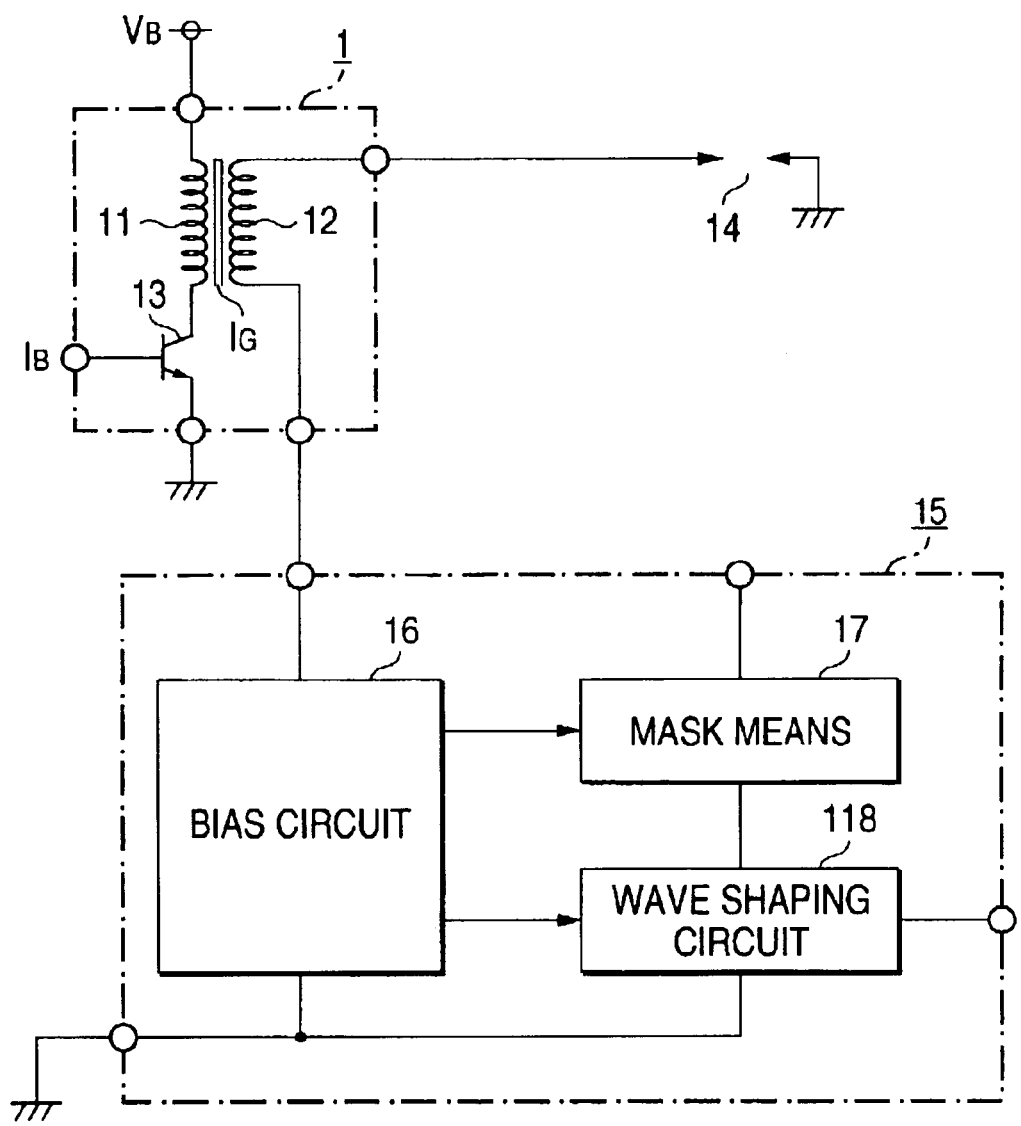
FIG. 6 is a drawing to show the configuration of a misfire detection apparatus of an internal combustion engine in a related art.
Figure 7A:
FIG. 7A is a timing chart of an ignition pulse to describe the operation of the misfire detection apparatus in the related art.
Figure 7B:
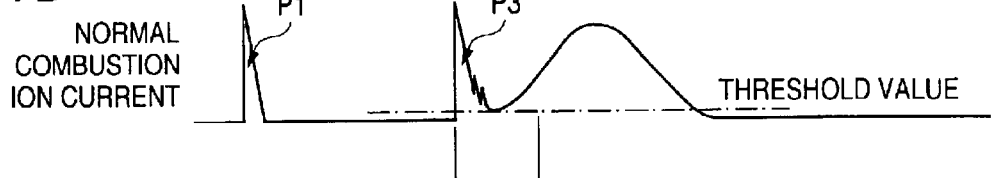
FIG. 7B is a timing chart of an ion current in a normal combustion.
Figure 7C:
FIG. 7C is a timing chart of a combustion pulse to describe the operation of the misfire detection apparatus in the related art.
Figure 7D:
FIG. 7D is a timing chart of an ion current when a misfire occurs.
Figure 7E:
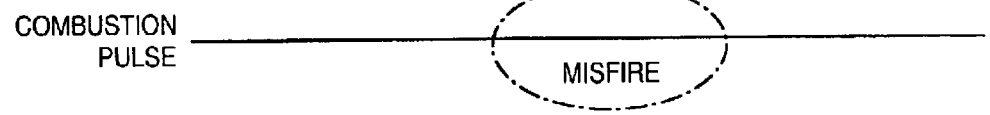
FIG. 7E is a timing chart of a combustion pulse when a misfire occurs to describe the operation of the misfire detection apparatus in the related art.
Figure 8:
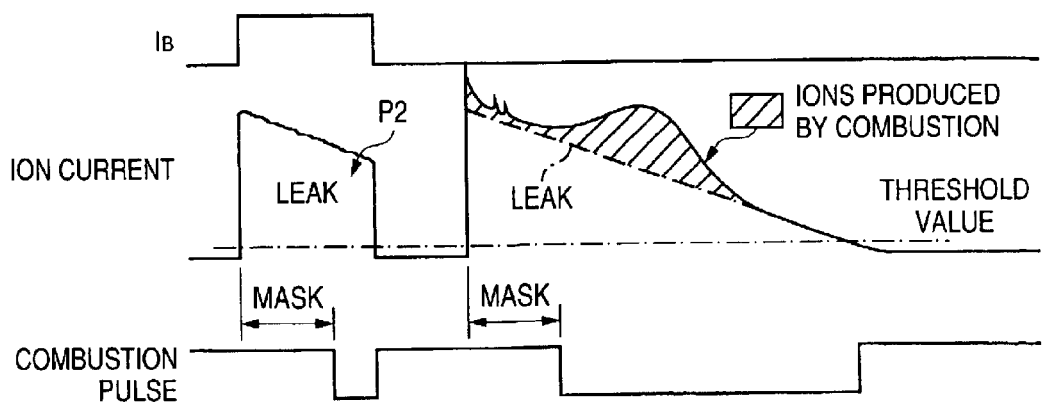
FIG. 8 is a timing chart to describe a problem of the misfire detection apparatus in the related art.

FIG. 5 is a drawing to show the configuration of a misfire detection apparatus of an internal combustion engine of this embodiment. The microprocessor 61 in FIG. 5 includes second derivative calculation means 51 instead of the derivative calculation means 50 in FIG. 4.

Figure 2:
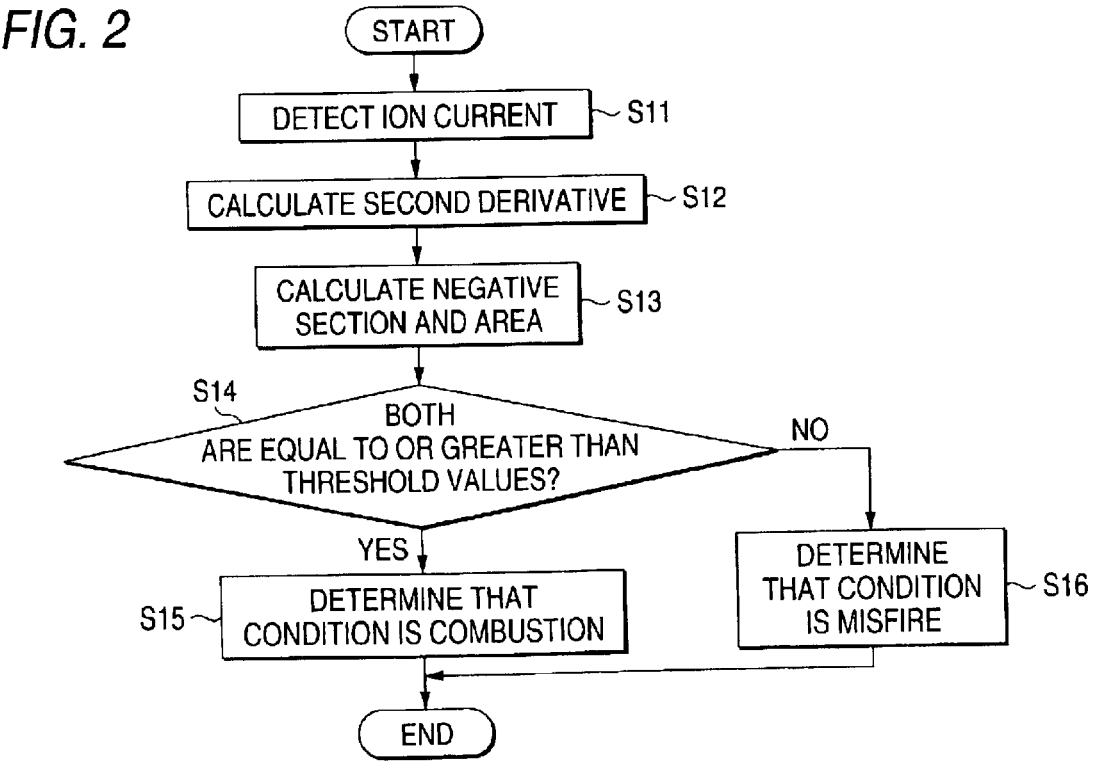
FIG. 2 is a flowchart to show the operation of a misfire detection apparatus of an internal combustion engine according to a second embodiment of the invention.

FIG. 2 is a flowchart to show the operation of a misfire detection apparatus of an internal combustion engine. The operation of the misfire detection apparatus of the second embodiment will be discussed with reference to FIGS. 2 and 3.

The bias circuit 16 detects an ion current (Step S11), and the second derivative calculation means 51 calculates a derivative of the ion current (Step S12). The mask means 17 masks the initial portion of the ion current waveform for removing initial noise. A peak caused by the initial noise occurs in the ion current waveform. The second derivative is calculated in the area in which mask is conducted so as to use only the waveform data after the peak.

The misfire determination means 18 calculates the section in which the second derivative becomes negative and the waveform area of the section (step S13).

The misfire determination means 18 compares the absolute values of the section and the waveform area with threshold values (step S14). If both are equal to or greater than the threshold values, the misfire determination means 18 determines that the condition is combustion (step S15); otherwise, the misfire determination means 18 determines that the condition is a misfire (step S16).

-Third Embodiment-

When the derivative means 50 or the second derivative means 51 calculates the derivative or the second derivative, a finite difference method is used. The difference width of the finite difference method is set to about a quarter to three quarters of a threshold value of the section width of misfire determination.

-Fourth Embodiment-

When the derivative means 50 or the second derivative means 51 calculates the derivative or the second derivative, a finite difference method is used. This finite difference method uses the center difference.

According to the invention, a combustion or misfire determination can be made with high accuracy and even when a leak current occurs and a misfire occurs, erroneous combustion determination is not made. Especially, using a derivative or a second derivative, it is made possible to make a combustion or misfire determination with high accuracy by performing comparatively easy calculation.

What is claimed is:

1. A misfire detection apparatus of an internal combustion engine for detecting combustion or a misfire of an air fuel mixture in the internal combustion engine based on an ion current generated at the combustion time of the air fuel mixture, comprising:

ion current detection means for detecting the ion current responsive to the amount of ions occurring in a cylinder just after combustion of the air fuel mixture in the cylinder in the internal combustion engine; and misfire determination means for calculating a predetermined function based on the ion current detection value and when the magnitude exceeds a threshold value, determining that the condition is combustion.

2. The misfire detection apparatus as claimed in claim 1 further comprising derivative calculation means for masking initial noise of the ion current and calculating a derivative;

wherein the misfire determination means calculates a section in which the derivative decreases and the decrease amount of the derivative in the section; and the misfire determination means determines that the condition is combustion when an area in which the section and the decrease amount are larger than threshold values exists.

3. The misfire detection apparatus as claimed in claim 1 further comprising second derivative calculation means for masking initial noise of the ion current and calculating a second derivative;

wherein the misfire determination means calculates a section and size of an area in which the second derivative becomes negative; and the misfire determination means determines that the condition is combustion when an area in which the section and the size are larger than threshold values exists.

4. The misfire detection apparatus as claimed in claim 2 wherein the derivative calculation means calculates the derivative using a finite difference method and sets the difference width of the finite difference method to a quarter to three quarters of the threshold value of the section.

5. The misfire detection apparatus as claimed in claim 3 wherein the second derivative calculation means calculates the second derivative using a finite difference method and sets the difference width of the finite difference method to a quarter to three quarters of the threshold value of the section.

6. The misfire detection apparatus as claimed in claim 4 wherein the finite difference method uses the center difference.

7. The misfire detection apparatus as claimed in claim 5 wherein the finite difference method uses the center difference.

* * * * *